United States Patent [19]

McCulloch

[11] 4,222,238

[45] Sep. 16, 1980

[54] APPARATUS FOR OBTAINING ENERGY FROM WAVE MOTION

[76] Inventor: Gary E. McCulloch, 1471 Etna Dr., Tulare, Calif. 93274

[21] Appl. No.: 933,415

[22] Filed: Aug. 14, 1978

[51] Int. Cl.³ ............................................. F03B 13/12
[52] U.S. Cl. ........................................ 60/398; 60/497; 290/53
[58] Field of Search ................. 60/398, 496, 497, 502, 60/721; 290/53, 42

[56] References Cited

U.S. PATENT DOCUMENTS

| | | | |
|---|---|---|---|
| 2,242,598 | 5/1941 | Quinte | 60/502 X |
| 4,123,667 | 10/1978 | Decker | 60/497 X |
| 4,139,984 | 2/1979 | Moody et al. | 60/398 |

Primary Examiner—Allen M. Ostrager
Assistant Examiner—Stephen F. Husar
Attorney, Agent, or Firm—Huebner & Worrel

[57] ABSTRACT

An apparatus characterized by a first conduit communicating with a fluid-filled first enclosure and having an open end adapted to be immersed in a wave-forming body of fluid for conducting pressure-induced flow toward and away from the first enclosure, a variable volume enclosure disposed within the first enclosure having its lower wall connected to a structure of variable buoyancy, adapted to expand and contract in conformity with the principles of a "Cartesian diver", a second conduit connected for providing a flow of fluid between the first and the variable volume enclosures, and a motor connected in the second conduit and adapted to be driven by the fluid flow therein.

10 Claims, 4 Drawing Figures

APPARATUS FOR OBTAINING ENERGY FROM WAVE MOTION

BACKGROUND OF THE INVENTION

1. Field of the Invention

The present invention relates to an apparatus for obtaining energy from wave motion, and more particularly to an apparatus for obtaining useful energy from pressure variations produced by wave motion.

2. Description of the Prior Art

The prior art includes various types of apparatus for obtaining useful energy from pressure variations occurring in a body of fluid. More specifically, numerous devices and systems have been suggested for obtaining useful energy resulting from changes in the level of a body of water caused by wave motion. An example is the use of a reciprocating pump assembly having a member floating on the surface of a body of water and mounted on the end of a piston rod reciprocating the rod as the surface level changes due to wave motion. Such an assembly is disclosed in the U.S. Pat. to Dilliner, No. 3,126,830 issued on Mar. 31, 1964.

However, insofar as is known to the applicant, the devices and systems heretofore suggested have not proven to be entirely satisfactory for various reasons, including costs and complexity.

It is, therefore, the general purpose of the instant invention to provide a simplified and economic apparatus which utilizes the principle of a "Cartesian diver" in converting energy of wave motion into useful energy.

OBJECTS AND SUMMARY OF THE INVENTION

Accordingly, it is an object of the present invention to provide an improved apparatus for obtaining energy from wave motion.

Another object is to provide an apparatus which obtains energy efficiently from pressure variations utilizing the principle of a Cartesian diver.

Another object is to provide an apparatus including a Cartesian diver adapted to be used in obtaining energy resulting from wave-induced pressure variations as the waves occur in a body of water.

These and other objects and advantages are achieved through the use of an apparatus for obtaining energy from pressure variations conducted to a first enclosure having disposed therein a weighted enclosure whose buoyancy is varied alternately from positive to negative in response to pressure-induced expansion and compression of gas confined in the weighted enclosure so that the weighted enclosure is caused to rise and sink for displacing fluid through a fluid motor.

DESCRIPTION OF THE PREFERRED EMBODIMENTS

First Form

Figure 1:
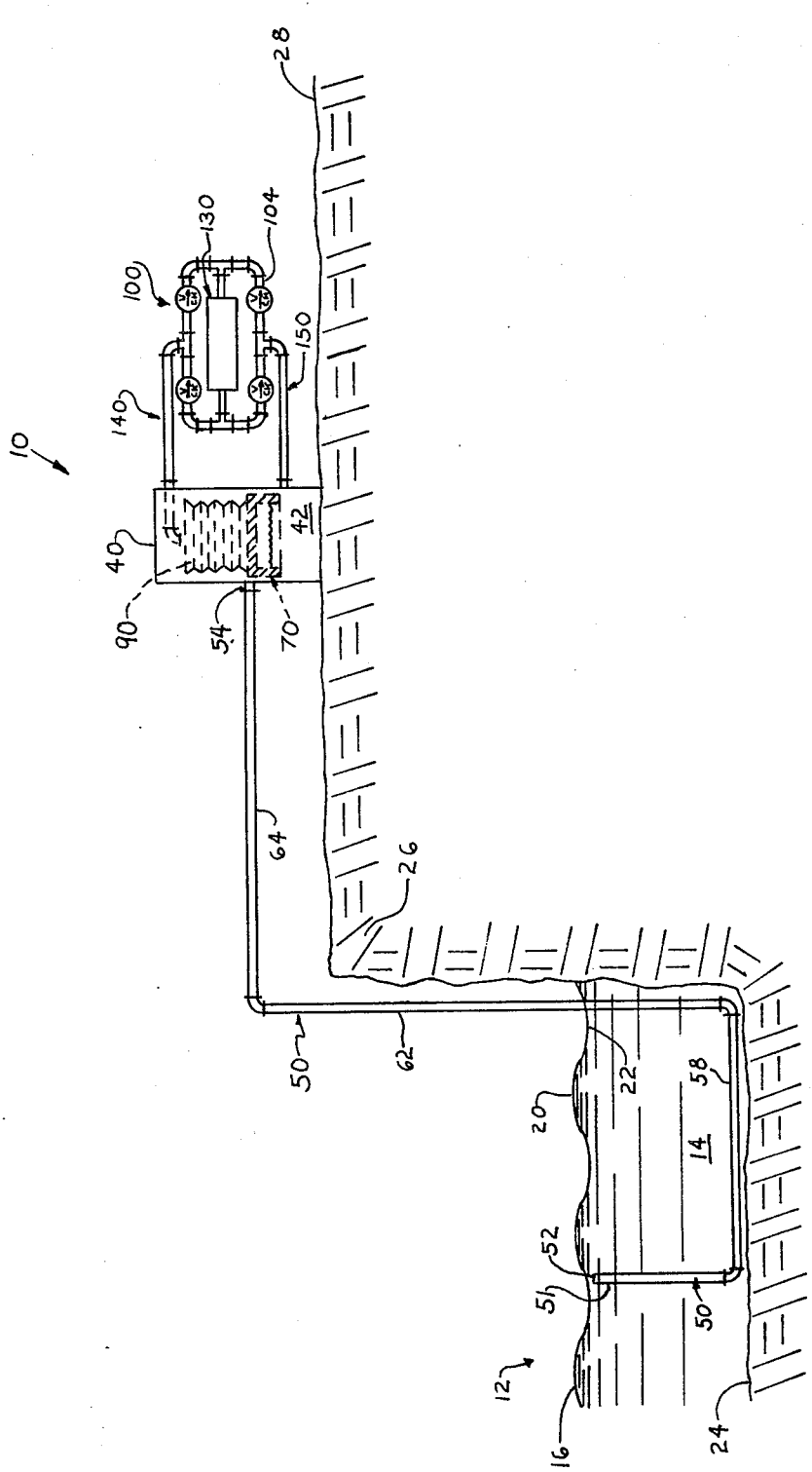
FIG. 1 is an elevational view of a body of fluid, wherein increasing and decreasing pressures occur sequentially due to wave motion, together with a first form of apparatus which embodies the principles of the present invention.

Referring now with more particularity to the drawings, wherein the various numerals designate like or corresponding parts in the several views, in FIG. 1 there is shown a first form of apparatus, generally indicated by the numeral 10, which embodies the principles of the instant invention.

The apparatus 10, as shown in FIG. 1, is depicted in an operative environment which includes a fragmentarily represented body 12 of fluid 14 in which waves 16 occur. Each wave has a crest 20 and a trough 22. The fluid pressure at a point in said body is proportional to the depth of fluid above the point. Therefore, the pressure is highest when the crest of a wave is above the point and lowest when the trough of a wave is above the point. The pressure at the point thus undergoes sequential variations consisting of an increasing pressure as a crest approaches the location on the fluid surface above the point and a decreasing pressure as the crest passes and a trough approaches.

Typically, the body 12 is the ocean while the fluid is water, and the waves are induced by the action of winds and tides, in a manner well understood by those familiar with oceanography. The body of fluid 14, however, is depicted in a bed 24 formed in the earth's surface, designated 26. Preferably, certain elements of the apparatus, subsequently to be described, are supported on an adjacent elevated portion 28 of the earth's surface disposed above the body 12 of fluid 14.

Figure 2:
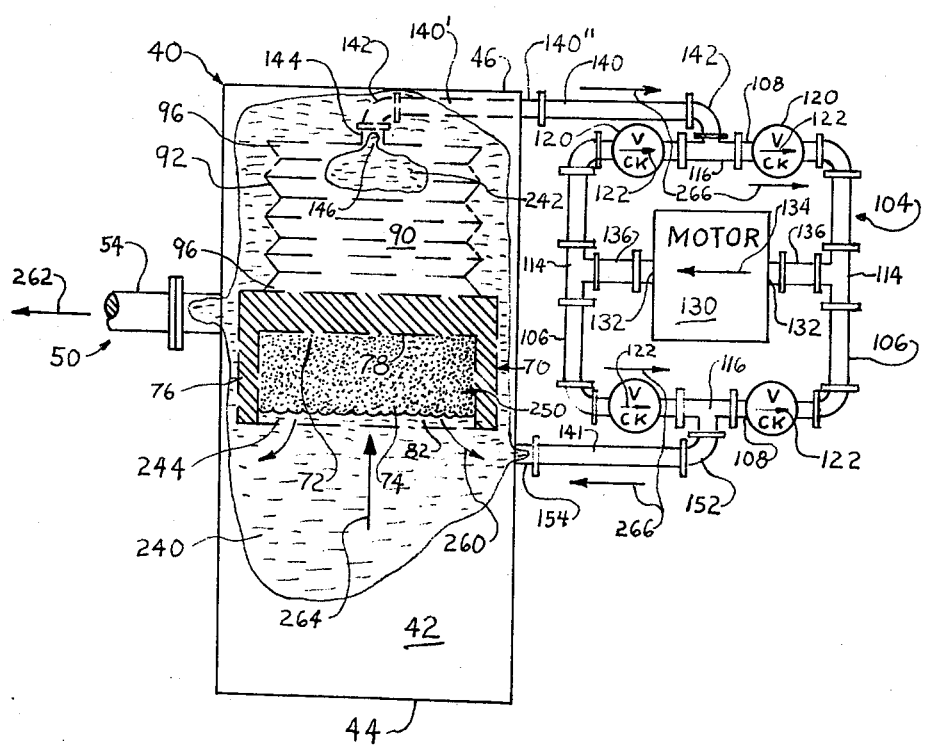
In FIG. 2 is a fragmentary elevational view, on an enlarged scale, of the apparatus of FIG. 1 with portions of enclosures utilized therewith being broken away to show the disposition of elements therein as the apparatus is subjected to the increasing pressure.

The apparatus 10, as shown in FIG. 1, includes a first or rigid enclosure 40. The rigid enclosure, preferably, has a side wall 42 of a cylindrical configuration. The enclosure is supported on a lower end wall 44 and is provided with upper end wall 46, FIG. 2. The apparatus 10 also includes a tubular first conduit 50 having a vertical section 51 including an upwardly open end 52 immersed in the body 12 of fluid 14 at a predetermined point therein, subject to the above described pressure variations. The conduit 50 also includes an end 54, remotely related to the end 52, connected for fluid communication to the first enclosure 40 as shown in FIGS. 1 and 2.

The conduit 50 also includes a first horizontal section 58 extending from the lower end of this vertical section 51 toward said enclosure, a second vertical section 62 extending upwardly from the first horizontal section to the elevation of said enclosure, and a second horizontal section 64 extending from the second vertical section to terminate at said opposite end 54 of the conduit. It should now be apparent that the conduit 50 is thus adapted to communicate to the first enclosure 40 fluid pressure variations occurring at the open end 52 and to conduct reversing flows of fluid resulting from these variations.

Within the apparatus 10 there also is included a second enclosure, designated 70. The second enclosure 70 is disposed totally within the first enclosure 40 and is provided with an upper portion 72 and a downwardly opening lower portion 74, FIG. 2. The second enclosure, preferably, comprises a cylindrical side wall 76 approximately concentrically related to the side wall 42 of the first enclosure by an upper end wall 78. The side wall and the end wall are relatively thick so that the second enclosure has substantial weight for a purpose subsequently to be described. It should now be apparent that the lower end, designated 82, of the second enclosure 70 is open for establishing fluid communication with the first enclosure 40.

The apparatus 10 also includes a third or variable volume enclosure 90, disposed within the first enclosure 40 between the upper end wall 46 thereof and the end wall 78 of the second enclosure 70. The third enclosure 90 includes a collapsible, convoluted, cylindrical side wall 92 which is approximately concentric with the first and second enclosures. The wall 92 is formed of a plurality of adjacent convolutions 94 which are of both annular and accuminate configurations so that the side wall 92, in effect, comprises an axially collapsible bellows. Preferably, the third enclosure 90 also includes vertically spaced opposite end walls 96 of a discoidal configuration interconnected by the collapsible side wall 92. The lower end wall is of integral construction with the upper end wall 78 of the second enclosure 70 while the upper end wall 96 of the third enclosure is fixedly connected to the upper end wall 46 of the first enclosure 40 in a manner subsequently to be described. Hence, it is to be understood that the lower end wall of the third enclosure 90 is supported to move vertically together with the second enclosure 70 in relation to the upper wall 46 of the first enclosure 40. The vertical movement of the second enclosure thus causes the side wall of the third enclosure to both contract and extend for varying the volume of this enclosure, the purposes of which will hereinafter become more readily apparent. The apparatus 10 also includes a motor system indicated generally by the numeral 100. This system is disposed externally of the first enclosure and is mounted adjacent thereto, as best shown in FIG. 1. The motor system includes a loop 104 of pipe or other tubular conduit arranged substantially in the form of a square so that the loop includes a pair of vertically oriented opposite lengths 106 of pipe, and a pair of opposite horizontally oriented lengths 108 of pipe. The corners of the loop are formed by four elbows 112, while each of the vertical lengths includes an individual tee fitting 114, and each of said horizontal lengths includes an individual tee fitting 116. The fittings are coupled in their respective lengths of pipe in a manner such that the bodies of the tee fittings in the vertical lengths are directed toward the center of the loop, while the body of the tee fittings in the horizontal lengths is directed away from the loop.

Each of the horizontal lengths includes a pair of check valves 120, symbolically represented, disposed on opposite sides of the tee fitting coupled therein in order to limit fluid flow in the loop to only a single direction, as indicated by the arrows 122.

A fluid-driven motor 130, symbolically represented, is disposed centrally of the loop 104. The motor is provided with a pair of oppositely related fluid connections 132, depicted as being adjacently related to the tee fittings 114 coupled in the vertical lengths 106 of pipe. The motor is of a known form and is adapted to be driven by the energy of fluid flowing unidirectionally therethrough in a direction as indicated by the arrow 134. As shown, the connections 132 are individually connected to the adjacent tee fittings by a pair of relatively short, horizontal lengths 136 of pipe or similar conduit. At this juncture it should be pointed out that the motor 130 is of any suitable design. For example, the motor comprises a turbine motor, where so desired, employed in coupled driving relationship with an electrical generator of suitable design. Since the details of the motor form no part of the instant invention, a detailed description thereof is omitted.

In any event, it should now be apparent that the check valves 120 adapt the motor system 100 to receive fluid flowing into the loop 104 at either of the tee fittings 116 of the horizontal lengths 106 of pipe and direct the flowing fluid unidirectionally through the motor 130. The fluid then, of course, flows from the motor at the other of the tee fittings 116.

In order to supply fluid to the loop 104, the apparatus 10 includes an upper horizontal connecting pipe 140, or other suitable conduit, and a lower connecting pipe 141. The pipe 140 includes a segment 140' which extends through a suitable fitting 140" mounted in the cylindrical side wall 42 of the first enclosure 40 at a point above the third enclosure 90. Each of the opposite ends of the pipe 140 includes a downwardly turned elbow fitting 142. The fitting 142 disposed within the first enclosure 40 is positioned above the center of the third enclosure and is rigidly connected to the upper end wall 96 thereof by a length 144 of pipe having a lower end 146 opening into the third enclosure 90. Thus the upper end wall 96 of the enclosure 90 is fixedly connected to the upper corresponding wall 44 of the first enclosure 40 by means of the lengths of pipe 140 and 144 and the fitting 140" mounted in the side wall 42.

The elbow fitting 142 disposed exteriorly of the first enclosure 40 is disposed above the uppermost one of the tee fittings 116 and interconnects this tee fitting with the horizontal connecting pipe 140.

The lower horizontal connecting pipe 141 serves to interconnect the lowermost tee fittings 116 with the first enclosure 40. One end of the pipe 141 is adjacently related to the lowermost fitting 116 and is provided with an upturned elbow fitting 152 which serves to connect the pipe 141 with the elbow. The pipe 141 also is extended from the elbow fitting 152 to position its opposite end 154 adjacent to the side wall 42 of the first enclosure and is connected thereto by means of a suitable fitting 154.

It now should be understood that the variable enclosure 90 functions as an impeller and that the loop 104 and pipes 140 and 141 define a conduit adapted to accommodate an establishment of fluid flows between the first enclosure 40 and the third enclosure, via the motor 130. Moreover, the motor 130 is situated so that the check valves 120 direct the fluid to enter the motor 130 from either of the connecting pipes 140 or 141 unidirectionally through the motor.

Second Form

Figure 4:
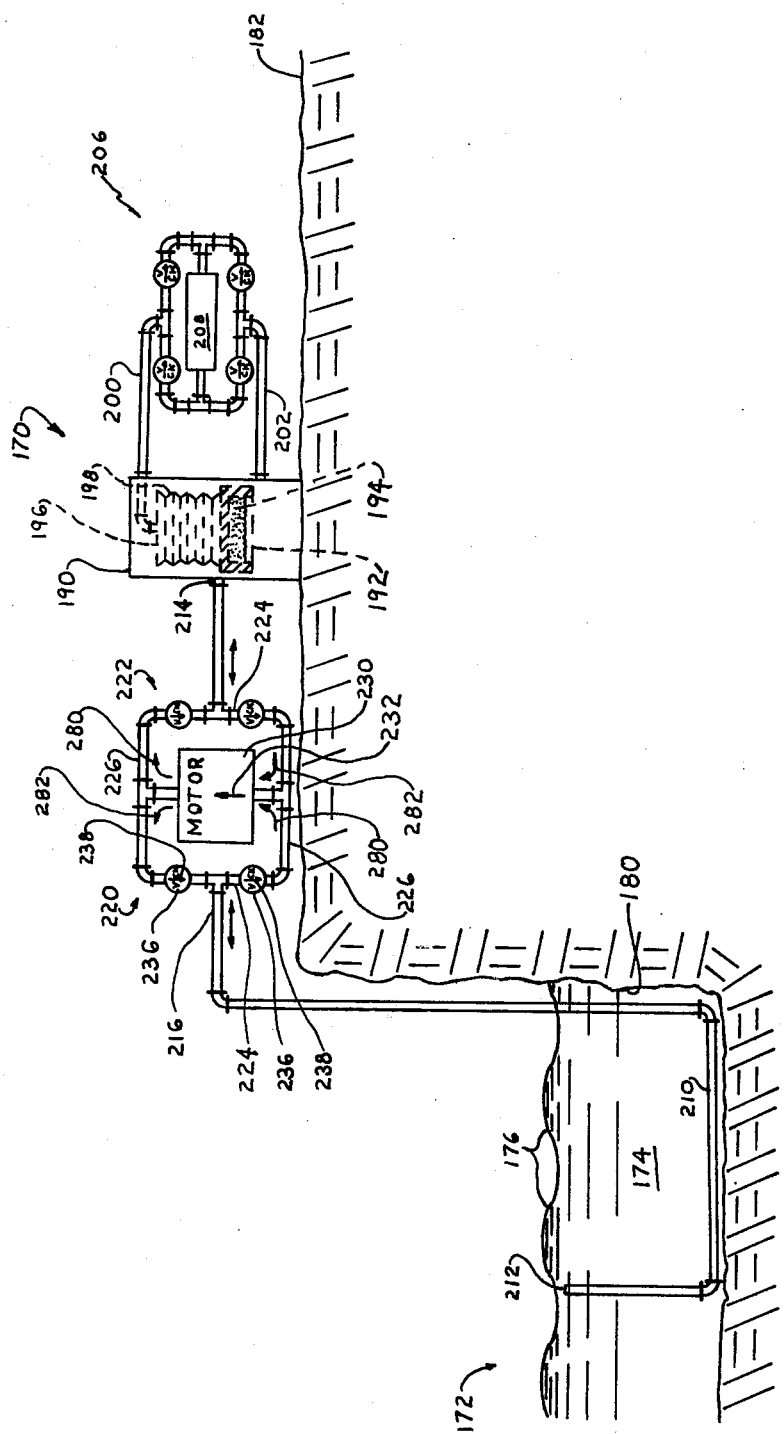
FIG. 4 is a view similar to FIG. 1 depicting a second form of the apparatus which embodies the principles of the invention.

The second form of apparatus embodying the principles of the present invention is depicted in FIG. 4 and is generally indicated by the numeral 170.

The second form of apparatus 170 is similar to the first form of apparatus 10 and is disposed in a substantially identical operating environment. This environment also includes a body 172 of fluid 174 in which waves 176 occur creating sequential increasing pressures and decreasing pressures and includes an earth surface 180 having an elevated portion 182. The second form of apparatus includes a rigid first enclosure 190, similar in design and function to the enclosure 40, supported on the elevated portion 182 of the surface, a downwardly open second enclosure 192, similar in design and function to the enclosure 70, having a quantity of gas 194 confined therein and a third enclosure 196, similar in design and function to the enclosure 90, having a collapsible side wall 198. An upper connecting pipe 200 and a lower connecting pipe 202 are provided for connecting to the enclosure 190 a motor system 206, similar in design and function to the motor system 100. The system 206 includes a motor 208 corresponding to the motor 130, aforedescribed. All of these elements are substantially identical to the corresponding elements of the first form of apparatus and are substantially identically disposed and connected in relation to each other. Therefore, a more detailed discussion thereof is omitted in the interest of brevity.

The second form of apparatus 170 also includes a first conduit 210 having an open end 212 immersed in the body 172 of fluid 174, an opposite end 214 connected to the first enclosure 190, and a horizontal section 216 extending above the elevated portion 182 of the earth surface. These elements of the first conduit are also substantially identical to the corresponding elements of the first form of apparatus 10.

However, it is important to note that within the conduit 210 of the second form of apparatus 170, between the section 216 and the end 214 there is included a motor system 220. The motor system 220 is similar to the motor system 206 and to the motor system 100 of the first form of apparatus 10, aforediscussed. As can be seen, the second system has a substantially square loop 222 of pipe or conduit which includes a pair of vertical side segments 224, a pair of horizontal side segments 226, and a second motor 230 adapted for unidirectional flow therethrough, as indicated by the arrow 232. The second motor system includes four check valves, each designated 236, disposed in the vertical side segment with a pair of the valves being disposed individually above and below the respective connections to the horizontal segments of the loop 222. Each of the valves is so arranged as to permit flow only in a downward direction therethrough as indicated by the arrows 238. Thus, the flow through the motor 230 is unidirectional.

It should now be clearly apparent that the structure of the motor system 220 is substantially identical to the structure of the motor system 100, but is rotated, in its vertical orientation, ninety degrees in a clockwise direction.

OPERATION

The operation of the described embodiments are believed to be clearly apparent, however, it briefly is summarized at this point.

First Form

Figure 3:
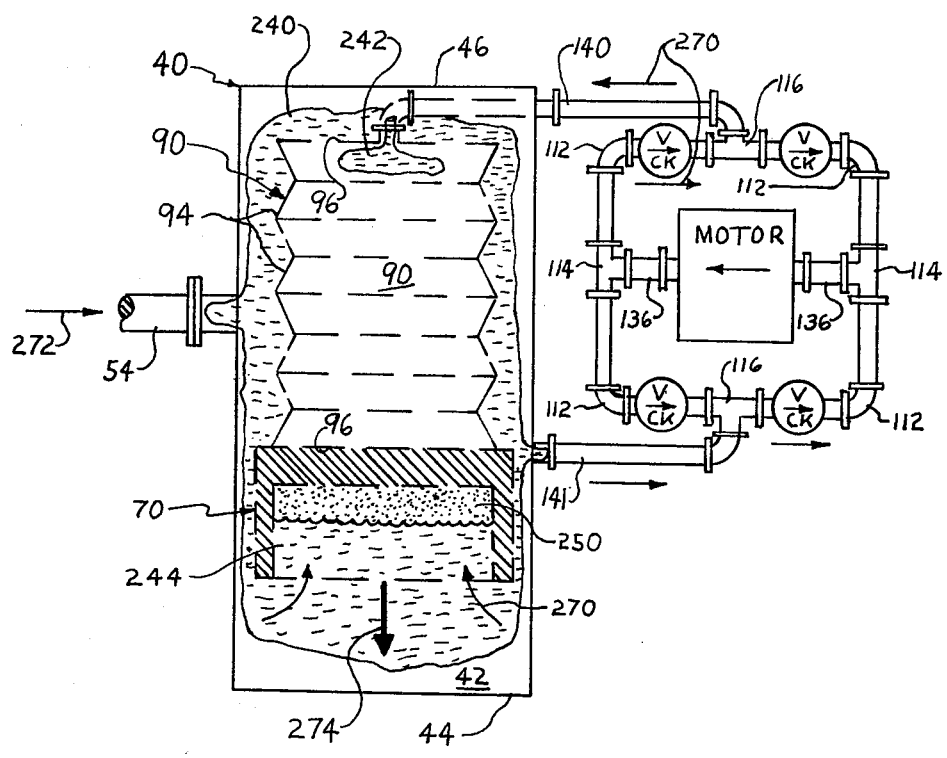
FIG. 3 is a fragmentary view similar to FIG. 2, but showing the disposition of said elements as the apparatus is subjected to decreasing pressure.

When the apparatus 10 of the first form of the invention is in operation, its conduit and enclosure elements shown in FIGS. 1, 2 and 3 are filled with the fluid 14, i.e. water, except for the upper portion 72 of the second enclosure 70 which contains a suitable gas, such as ambient atmosphere. A quantity of the fluid 14 fills the conduit 50 and communicates the pressure variations occuring at the open end 52 thereof to the first enclosure 40. Another quantity 240 of this fluid is contained within the first enclosure 40.

Referring now to FIG. 1, there is thus a volume, designated 242, of this quantity of fluid which fills the third enclosure and another volume, designated 244, in the lower portion 74 of the second enclosure 70. The upper portion of the second enclosure contains a quantity, designated 250, of the gas. The gas is, of course, confined within the second enclosure by the fluid in its open end or lower portion. The gas, of course, resiliently compresses and expands in response to pressure variations applied thereto.

During a period of decreasing pressure at the open end 52 of the conduit 50, due to the approach of a trough 22 of a wave 20, decreasing pressure is communicated to the first enclosure through the conduit. The decreasing pressure in this enclosure is, in turn, communicated to the quantity of gas 250 through the open lower end 82 of the second enclosure. As a result, the gas expands, expelling a portion of the volume 244 of the fluid 14 in the second enclosure downwardly into the first enclosure, as indicated by the arrows 260, FIG. 2. The fluid so expelled forces a corresponding volume of fluid to flow from the first enclosure through the end 54 of the conduit 50 as indicated by the arrow 262, also FIG. 2. The fluid so supplied to the conduit in response to said decreasing pressure, of course, flows through the conduit toward its open end 52.

The expulsion of a portion of the volume 244 of the fluid from the second enclosure 70 reduces the weight of the enclosure and its contents by the weight of said expelled fluid 14. The proportions and dimensions of the enclosure are such that, for the expected pressure variations due to action of the waves 16 at the open end 52 of the conduit 50, reduction in weight causes the second enclosure 70 to become buoyant. Expressed in another way, the reduction in weight results in the buoyancy of the second enclosure, increasing to a positive value. When the second enclosure becomes buoyant, it floats in the quantity 240 of fluid in the first enclosure 40 and rises therein as indicated by the arrow 264.

As the second enclosure 70 rises, it carries with it the lower of the end walls 96 of the third enclosure causing the convoluted side wall 92 to collapse axially and reduce the volume of the third enclosure. As this volume is reduced, the volume of the portion of the first enclosure 40, which is exclusive of the second and third enclosures, increases correspondingly due to the rising of the second enclosure. As a result, and as indicated by the arrows 260, a flow of fluid is transferred in sequence from the third enclosure 90 through the upper connecting pipe 140, the motor system 100, and the lower connecting pipe 141 into the first enclosure 40. As previously described, the check valves 120 of the motor system 100 direct the flow of fluid through the motor 130 in the direction indicated by the arrow 134 so that the motor extracts the energy due to said flow in the form of useful energy which can be used for any desired purpose such as the generation of electric power.

During periods of increasing pressure at the open end 52 of the conduit 50, due to the approach of a crest 20 of a wave 16, the increasing pressure is communicated, in the same manner as the decreasing pressure previously described, through the conduit 50 to the first enclosure 40 and applied to the quantity of gas 250. The increasing pressure compresses the gas, FIG. 3, so that the portion of the volume 244 of fluid which previously was expelled from the second enclosure 70, as previously described, returns to the second enclosure 70 from the first enclosure as indicated in FIG. 3 by the arrows 270. A corresponding volume of fluid flows through the conduit 50 from its open end 52, as indicated by the arrow 272, and is received in the first enclosure in response to the increasing pressure. The increase in weight of the second enclosure and its contents due to said returned portion of fluid results in the buoyancy of the second enclosure becoming negative so that the enclosure now sinks within the first enclosure as indicated by the arrow 274.

As the second enclosure 70 sinks, it carries with it the lower of the end walls 96 of the third enclosure 90, expanding the convoluted side wall 92 and increasing the volume of the third enclosure. A flow of the fluid displaced by the downward movement of the second enclosure passes sequentially, as indicated by the arrows 276, from the first enclosure through the lower connecting pipe 141, the motor system 100, and the upper connecting pipe 140, into the third enclosure. The movement of said lower wall 96 of the third enclosure, the change in volume therein produced by this movement, and the flow through said pipes into the motor system 100 are, of course, opposite in direction to the corresponding actions occuring during decreasing pressure at the open end 52 of the conduit 50. However, since the check valves 120 of the motor system only permit unidirectional flow through the motor 130, the motor produces useful energy from this reverse flow in the same manner as during periods of decreasing pressure.

The above described floating of the enclosure due to expansion of the gas and the sinking of the second enclosure 70 due to compression of the quantity of gas 250 therein correspond to the well known operation of a "Cartesian diver" device used to demonstrate the principles of buoyancy.

Second Form

The second form of apparatus 170 is, as previously described, similar to the first form of apparatus 10 with the addition of the second motor system 220 in the first conduit 210. This conduit conducts flows of the fluid 174 toward and from the open end 212 in response, respectively, to decreasing and increasing pressure thereat due to motion of the waves 176. The operation of the elements common to the both forms of apparatus is substantially identical and need not be described further at this point.

As stated previously, the second motor system 220 of the second form is similar to the motor system 100 of the first form, rotated ninety degrees. Therefore, during an increasing pressure at the open end 212 of the first conduit 210, fluid flow occurs through said second system as indicated by the arrows 280. Conversely, during decreasing pressure at said open end, fluid flows through said second system as indicated by the arrows 282. These flows pass unidirectionally through the motor 230 so their flow energy is converted into useful energy as described in connection with the first form.

The second motor system 220 converts additional flow energy into useful energy in a situation in which the first motor system 206 cannot convert all of the flow energy available to the apparatus 170. This situation arises when the difference between the crests and troughs of the waves 176 is so great that the resulting pressure variations exceed the variation required to cause the second enclosure 192 alternately to float and sink. These excessive variations will, however, continue to compress and expand the gas 194 after the second enclosure, respectively, sinks and rises so that fluid flow continues to occur in the first conduit 210 in response to said variations. The flow energy of this flow is converted to useful work by the second motor system.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. In an apparatus for converting potential energy in a body of water to useful energy, comprising:
   A. A water-filled conduit disposed near the surface of a body of water characterized by pressure varying in response to a series of waves moving across the surface of the body for inducing variations in the pressure of the water in said conduit;
   B. means including a variable-volume chamber for alternately accepting and discharging flows of water in response to variations in the volume of the chamber;
   C. pressure-transmitting means communicating with said conduit and with said chamber for varying the volume of the chamber in response to pressure variations induced in the fluid of the conduit; and
   D. means connected in communication with the chamber for converting the energy of the flows of water to useful energy.

2. An apparatus for obtaining energy in response to pressure variations in a body of fluid characterized by sequentially established increasing and decreasing pressures comprising:
   A. a conduit having an open end immersed in the body of fluid and an opposite end remotely related to said open end adapted to conduct a flow of fluid away from the open end in response to an increasing pressure as it occurs within the body and to conduct a flow of fluid toward said open end in response to a decreasing pressure as it occurs within the body;
   B. a rigid enclosure connected to said opposite end for receiving the flow of fluid conducted away from the open end and for supplying the flow of fluid conducted toward said open end in response to the increasing and decreasing pressures; and
   C. variable buoyancy means within the enclosure responsive to said increasing and decreasing pressures for converting flow energy of the flows of fluid into useful work.

3. The apparatus of claim 2 further comprising means within the conduit for converting flow energy of said fluid flows away from and toward said open end into useful energy.

4. The apparatus of claim 2 wherein the variable buoyancy means comprises:
   A. a second enclosure of substantial mass having a predetermined upper portion and a lower portion disposed in fluid communication with the rigid enclosure;
   B. a variable volume of fluid disposed within the lower portion of said second enclosure varying the buoyancy of the second enclosure;
   C. resiliently compressible and expandible means disposed within said upper portion of said second enclosure adapted to expand the flow of fluid conducted toward said open end, for expelling a portion of the volume of the fluid in said lower portion into the rigid enclosure, for thus increasing the buoyancy of the second enclosure to a positive value whereby the second enclosure is caused to float and to compress in response to the flow of fluid conducted away from said open end for returning the expelled portion of the quantity of fluid into the second enclosure from the rigid enclosure for thus decreasing the buoyancy of the second enclosure to a negative value, whereby the second enclosure is caused to sink;

D. a third enclosure having movable wall means connected to the second enclosure for movement therewith whereby the volume of the third enclosure is increased and decreased in response to movement of said second enclosure; and E. means for conducting a flow of fluid between the rigid enclosure and the third enclosure in response to said increasing and decreasing volume of the third enclosure.

5. The apparatus of claim 4 wherein the third enclosure includes a wall of collapsible, convoluted construction.

6. The apparatus of claim 4 in which the means for conducting a flow of fluid between the first enclosure and the third enclosure includes a motor driven by said flow of fluid between said enclosures.

7. An apparatus for obtaining energy from pressure variations characterized by sequentially increasing pressure and decreasing pressure due to wave movement in a body of fluid at a predetermined point in said fluid comprising:

A. a first enclosure;

B. a weighted, downwardly open enclosure disposed within the first enclosure;

C. a variable volume enclosure disposed within the first enclosure having vertically oppositely disposed ends individually fixedly connected to the first enclosure and to the downwardly open enclosure and a collapsible wall interconnecting said ends;

D. a quantity of said fluid contained in the first enclosure including a volume of the fluid filling the variable volume enclosure and a volume thereof downwardly disposed in the weighted enclosure;

E. a first conduit communicating said pressure variations between said point and the first enclosure;

F. a quantity of gas upwardly confined in the weighted enclosure by the fluid therein, adapted for expansion due to said decreasing pressure partially to expel the volume of fluid in the weighted enclosure therefrom and increase the buoyancy thereof floating the weighted enclosure upwardly within the first enclosure carrying the end of the variable volume enclosure connected thereto and varying the volume of the variable volume enclosure in a predetermined direction, and adapted for compressing due to said increasing pressure admitting fluid upwardly in the weighted enclosure and reducing the buoyancy thereof sinking the weighted enclosure within the first enclosure carrying the end of the variable volume enclosure connected thereto and varying the volume of the variable volume enclosure oppositely of said predetermined direction;

G. a second conduit interconnecting the first enclosure and the variable volume enclosure for accommodating fluid flow therebetween due to said varying volume of the variable volume enclosure in opposite directions corresponding to said floating and sinking of the weighted enclosure; and H. means within the second conduit for converting the flow energy of said oppositely flowing fluid into useful energy.

8. The apparatus of claim 7 in which the first enclosure includes an upper wall and the variable volume enclosure is disposed within the first enclosure upwardly of the weighted enclosure with one of said vertically opposite ends connected to said upper wall and the other of said vertically opposite ends connected to the weighted enclosure.

9. An apparatus as defined in claim 7 wherein a flow of fluid is established in said conduit in response to the pressure variations and further comprising means connected to said first conduit for converting the energy of said fluid flow to useful energy.

10. The apparatus of claim 8 in which the second conduit includes a fluid-driven motor adapted for unidirectional flow therethrough and check valve means for maintaining said unidirectional flow when the weighted enclosure is rising and when it is sinking.

* * * * *